April 1, 1924.

J. CRIMMINS 1,488,868

BACON SLICING MACHINE PLATFORM

Filed Aug. 24, 1923   2 Sheets-Sheet 1

Witnesses.
W. P. Bayly.
E. W. Bayly.

Inventor.
John Crimmins.
per. John Pitt Bayly.
Attorney

April 1, 1924.

J. CRIMMINS 1,488,868

BACON SLICING MACHINE PLATFORM

Filed Aug. 24, 1923    2 Sheets-Sheet 2

Witnesses.
H. P. Bayly.
E. W. Bayly.

Inventor.
John Crimmins
per. John Pitt Bayly.
Attorney.

Patented Apr. 1, 1924.

1,488,868

UNITED STATES PATENT OFFICE.

JOHN CRIMMINS, OF WIGAN, ENGLAND.

BACON-SLICING-MACHINE PLATFORM.

Application filed August 24, 1923. Serial No. 659,129.

*To all whom it may concern:*

Be it known that I, JOHN CRIMMINS, a British subject, residing at 8 Warrington Lane, Wigan, in the county of Lancashire, England, have invented a new and useful Improvement in Bacon-Slicing-Machine Platforms, of which the following is a specification.

The platform at present in use on all bacon slicing machines consists of a flat plate the surface of which is studded with spikes. These spikes are necessary to hold the material while being sliced.

The spikes are, however, a danger to persons using the machine as they protrude above the surface and are always exposed, also when material is being placed on or removed from the platform it has to be lifted bodily on and off, a great inconvenience. There is danger of injury also to the hands of persons using the machine, and when cleaning the platform, owing to the exposed spikes.

In accordance with my invention, I do away with spikes on the surface of the platform, as heretofore used, and provide the spikes on a separate plate or plates, that is preferably hinged or pivoted on the underside of the platform. The platform is perforated with holes corresponding in position and number with the spikes on the underlying plate, and is fitted with springs strong enough to support the platform with its upper surface clear of the spikes even when the meat to be sliced is placed thereon. When however the rack-lever is drawn down and the platform is depressed, the spikes protrude through the perforations in the platform and enter the meat to be sliced.

In the accompanying drawings Figs. 1, and 2, are elevations of a part of a bacon-slicing machine fitted with my improved platform. In Fig. 2, the rack lever is shown depressed and the spikes in action.

Figure 1:
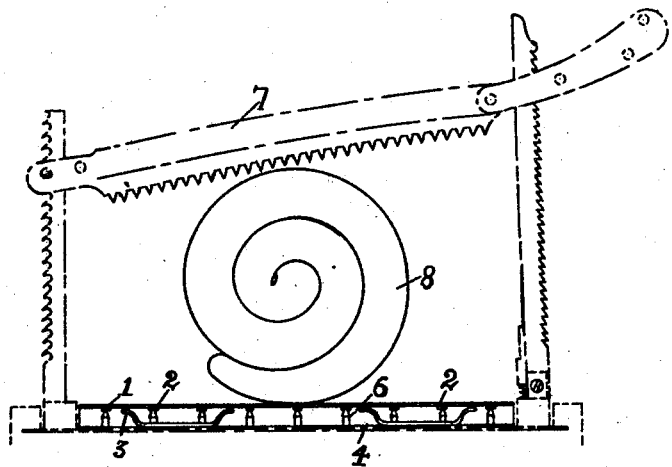
Figure 2:
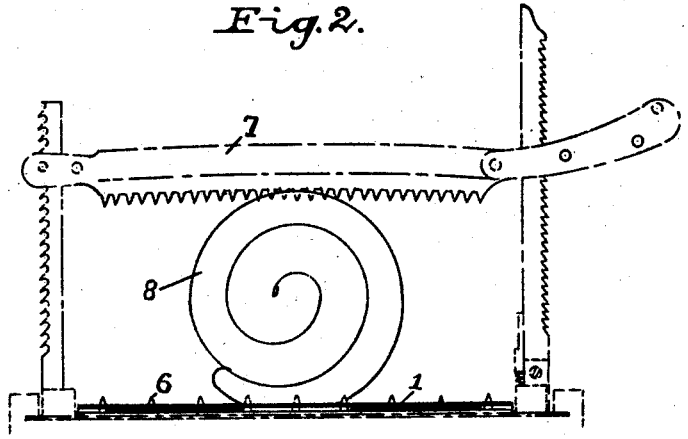
Figure 3:
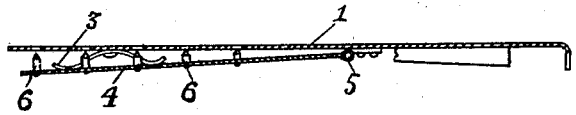
Fig. 3, is a sectional side elevation of the improved platform.
Figure 4:
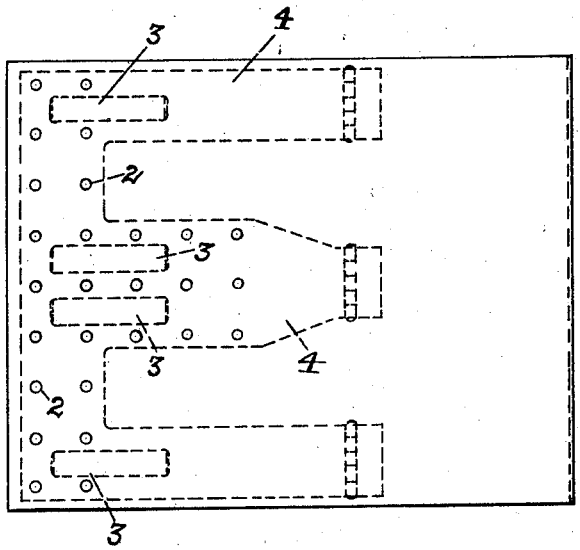
Fig. 4, is a plan view.

Referring to these figures, my improved platform is constructed as follows. The platform 1 is a plate identical in every way to the one in use, except that there are no spikes on its surface. Instead of having spikes my improved platform is perforated with a number of holes 2. On the underside of the platform 1 fit springs of any desired shape such as 3. The springs 3 are strong enough to support the platform even when the material which it is desired to slice is placed thereon. In conjunction with these springs I have one or more plates 4 which are hinged at 5 to the underside of the perforated platform 1. In the drawing a single plate is shown. The hinged plate 4 lies flat on the surface of the base or bed plate of the machine. On the surface of the hinged plate or plates I have spikes 6 fixed rigidly, one spike directly under each perforation in the upper platform. When the material to be sliced is placed on my improved platform, the platform 1 does not sink with its load, and the material can be slid on and off without lifting. But when the material is placed in position and the rack-lever 7 drawn down, the platform 1 is depressed, and the spikes 6 in the hinged plate beneath protrude through the perforations 2 and sink into the material 8 which is being sliced. When the pressure of the lever is released, the platform again rises, and the material can be drawn off without lifting.

The spikes in the hinged base plate only protrude through the perforated platform when the lever is applied to hold down the material. At all other times the dangerous spikes are isolated. The platform may be cleaned without any danger of injury to the hands. The use of this improved platform will also save much time.

I claim:

A platform for a slicing machine, a plate having spikes and fastened to said platform beneath the same, said platform having perforations therein equal in number to the spikes, and a spring arranged between the plate and platform to keep the upper surface clear of the spikes when there is no pressure on the platform.

JOHN CRIMMINS.